US009621090B2

United States Patent
Chong et al.

(10) Patent No.: US 9,621,090 B2
(45) Date of Patent: Apr. 11, 2017

(54) VARIABLE SPEED GENERATOR HAVING MULTIPLE EXCITER WINDINGS AND SELECTABLE, INDEPENDENTLY ACTIVATABLE POLE CONFIGURATIONS

(71) Applicant: ROLLS-ROYCE PLC, London (GB)

(72) Inventors: Ellis F H Chong, Derby (GB); Andrew Mackay, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 14/831,433

(22) Filed: Aug. 20, 2015

(65) Prior Publication Data

US 2016/0079899 A1 Mar. 17, 2016

Related U.S. Application Data

(62) Division of application No. 13/450,047, filed on Apr. 18, 2012, now abandoned.

(30) Foreign Application Priority Data

May 11, 2011 (GB) .................................. 1107833

(51) Int. Cl.
*H02P 9/00* (2006.01)
*H02P 9/38* (2006.01)
(Continued)

(52) U.S. Cl.
CPC ............. *H02P 9/48* (2013.01); *H02K 7/1823* (2013.01); *H02K 19/32* (2013.01)

(58) Field of Classification Search
CPC ......... H02P 9/48; H02K 19/32; H02K 7/1823
See application file for complete search history.

(56) References Cited

U.S. PATENT DOCUMENTS 3,200,324 A * 8/1965 Wagner .................. H02K 57/00
322/32
4,168,459 A * 9/1979 Roesel, Jr. .............. H02J 9/066
310/112

(Continued)

FOREIGN PATENT DOCUMENTS

GB     1 494 126 A    12/1977
JP     H09-149613 A    6/1997

OTHER PUBLICATIONS

Apr. 20, 2015 Office Action issued in U.S. Appl. No. 13/450,047.
Oct. 29, 2011 Search Report issued in British Patent Application No. 1107833.4.

*Primary Examiner* — Tulsidas C Patel
*Assistant Examiner* — S. Mikailoff
(74) *Attorney, Agent, or Firm* — Oliff PLC (57) ABSTRACT

A variable speed generator for producing AC electrical power includes an alternator powerable by rotational action to generate a first AC current, and a first rectifier which rectifies the first AC current from the alternator. The generator further includes a main exciter having a first field winding which receives the rectified first AC current, and having a first armature which produces in response a second AC current. The generator further includes a second rectifier which rectifies the second AC current from the first armature. The generator further includes a main generator having a second field winding which receives the rectified second AC current, and having a second armature which produces in response an output AC current. The second field winding is configured to provide a plurality of selectively activatable pole configurations which differ in the number of their poles, such that the frequency of the output AC current can be varied by switching between the pole configurations. The variable speed generator further includes a control arrangement for activating the selected pole configuration.

2 Claims, 6 Drawing Sheets

(51) Int. Cl.
*H02K 19/32* (2006.01)
*H02P 9/48* (2006.01)
*H02K 7/18* (2006.01)

(56) References Cited

U.S. PATENT DOCUMENTS

| | | |
|---|---|---|
| 4,467,267 A | 8/1984 | Hucker et al. |
| 4,628,245 A | 12/1986 | Quayle |
| 4,663,536 A * | 5/1987 | Roesel, Jr. ................ H02P 9/10 290/45 |
| 2001/0006292 A1 | 7/2001 | Inaba et al. |
| 2004/0027078 A1 | 2/2004 | Xu et al. |
| 2004/0183308 A1 | 9/2004 | Xu et al. |
| 2006/0038405 A1 | 2/2006 | Xu et al. |
| 2008/0067984 A1* | 3/2008 | Anghel .................... F01D 15/10 322/52 |
| 2008/0150494 A1 | 6/2008 | Lemmers et al. |
| 2009/0121688 A1 | 5/2009 | Lemmers et al. |
| 2012/0211981 A1* | 8/2012 | De Wergifosse ....... F02C 7/275 290/31 |

* cited by examiner

VARIABLE SPEED GENERATOR HAVING MULTIPLE EXCITER WINDINGS AND SELECTABLE, INDEPENDENTLY ACTIVATABLE POLE CONFIGURATIONS

CROSS REFERENCE TO RELATED APPLICATIONS

This is a divisional of U.S. application Ser. No. 13/450,047 filed Apr. 18, 2012, which claims priority to GB 1107833.4 filed May 11, 2011. The prior applications, including the specifications, drawings and abstract, are incorporated herein by reference in their entirety.

TECHNICAL FIELD

The present invention relates to a variable speed generator for producing AC electrical power, and particularly, but not exclusively, to an aircraft variable frequency starter generator.

BACKGROUND

Figure 1:
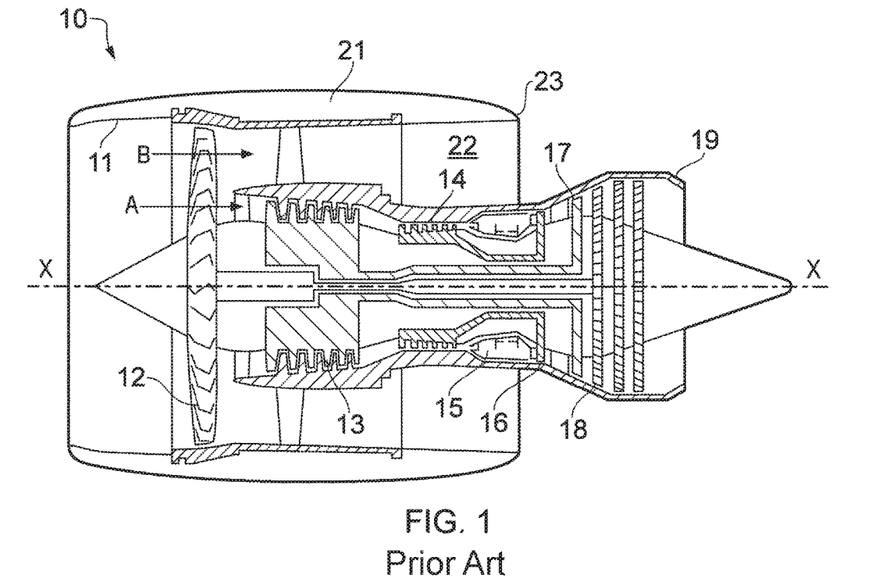
FIG. 1 shows a schematic longitudinal section through a ducted fan gas turbine engine.

With reference to FIG. 1, a ducted fan gas turbine engine generally indicated at 10 has a principal and rotational axis X-X. The engine comprises, in axial flow series, an air intake 11, a propulsive fan 12, an intermediate-pressure compressor 13, a high-pressure compressor 14, combustion equipment 15, a high-pressure turbine 16, and intermediate-pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

The gas turbine engine 10 works in a conventional manner so that air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

Electrical power is usually extracted from such an engine for use within the aircraft by a wound-field synchronous generator. The generator can be mechanically connected to either the high-pressure shaft or to the intermediate-pressure shaft, via a transmission drive and accessory gearbox. DC current is applied to the rotor of the generator in the field winding. The frequency of the current produced in the generator stator winding is thus directly proportional to the speed of the shaft to which the generator is connected, the gear ratio between the engine shaft and the generator, and the number of pole pairs in the generator.

In contemporary aircraft platforms, the output frequency range of the generator typically varies over a frequency range of 400 to 800 Hz; the exact numbers depending upon the platform, and corresponding directly to an acceptable speed range for the shaft to which the generator is connected. The generator frequency range is provided to the suppliers of electrical equipment within the aircraft, so that their equipment can be configured to receive voltage in this frequency range.

Figure 2:
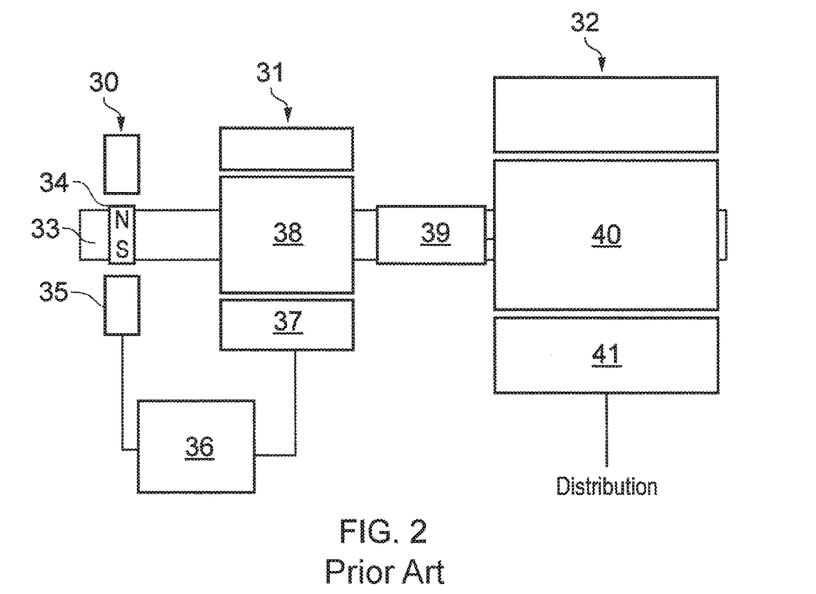
FIG. 2 shows a schematic diagram of a variable frequency starter generator.

Due to its variable output frequency, this type of generator is known as variable frequency starter generator (VFSG). FIG. 2 shows a schematic diagram of a VFSG, which includes a permanent magnet alternator (PMA) 30, main exciter 31 and main generator 32. The rotating parts of the PMA, exciter and generator are physically all mounted on the same shaft 33 and rotate at the same speed. The DC current injected into the field winding of the main generator comes from a rotating diode rectifier which is powered from the main exciter, which in turn is powered from the PMA.

The PMA 30 has permanent magnets mounted on its rotor 34. As the rotor spins, an AC main exciter voltage is induced across the stationary armature winding 35 of the PMA. This winding is connected to a voltage regulator circuit 36 which rectifies a controlled amount of AC current from the PMA stator winding and injects DC current into the stationary field winding 37 of the exciter 31. This in turn induces an AC voltage across the rotating armature winding 38 of the exciter (the exciter is referred to as inside out, with a stationary field winding and a rotating armature winding). A rotating diode rectifier circuit 39, producing a DC current, is connected to the armature winding of the exciter. The output of this rotating rectifier is then connected to the rotating field winding 40 of the main generator 32, inducing a controlled, AC voltage across the generator's stationary armature winding 41. Due to the high speed of rotation of the shaft 33 in aerospace generators, a brushed system for applying field current to the rotor of the main generator is not desirable.

The voltage regulator circuit 36 responds to changes in the load on the generator to maintain its output voltage at the required magnitude. It does not affect the generator output frequency. In some arrangements, for example during starting, the PMA 30 may not be used and electrical power can be provided directly to the exciter 31 from an alternative source.

The use of a VFSG and direct mechanical coupling between the engine shaft and the generator means that a restriction on the frequency range of the generator electrical output maps directly to a speed range restriction on the engine shaft. The ratio of maximum to minimum speed is typically around 2.2:1 (producing a frequency range of e.g. 800 Hz to 360 Hz).

If the VFSG and gearbox are configured to produce maximum frequency when the engine shaft is at its maximum speed, the minimum frequency condition effectively imposes a minimum speed and therefore a minimum thrust condition on the engine. During idling conditions, such as descent and taxiing, it is desired that the engine should produce as little thrust as possible, in order to save fuel. However, in order to remain within the electrical frequency range of the generator, the idle thrust of the engine may have to be set artificially high. Therefore it is desirable to have some degree of freedom between the electrical frequency and the mechanical speed.

It would be desirable to provide a generator which can vary the frequency of its output current independently of engine speed.

SUMMARY

Accordingly, the present invention provides a variable speed generator for producing AC electrical power, the variable speed generator including:

an alternator powerable by rotational action to generate a first AC current, a first rectifier which rectifies the first AC current from the alternator, a main exciter having a first field winding which receives the rectified first AC current, and having a first armature which produces in response a second AC current, a second rectifier which rectifies the second AC current from the first armature, and a main generator having a second field winding which receives the rectified second AC current, and having a second armature which produces in response an output AC current;

wherein:

the second field winding is configured to provide a plurality of selectively activatable pole configurations which differ in the number of their poles, such that the frequency of the output AC current can be varied by switching between the pole configurations, and the variable speed generator further includes a control arrangement for activating the selected pole configuration.

Advantageously, by switching between the pole configurations to vary the frequency of the output AC current, the frequency can be changed independently of the speed of the rotational action, such that the allowable rotational speed range can be increased. Furthermore, the variable speed generator can be implemented without using brushes and slip rings.

The generator may have any one or, to the extent that they are compatible, any combination of the following optional features.

Preferably, the pole configurations of the second armature are reconfigurable to match the number of poles in the second field winding, e.g. to make the number of poles on the second armature the same as the number of poles on the second field winding. For example, the control arrangement can activate reconfiguration of the second armature at the same time as activating the selected pole configuration of the second field winding.

Typically, the alternator has a rotor carrying one or more field magnets, and a stator carrying an alternator armature in which the first AC current is generated. Typically, the main exciter has a stator carrying the first field winding, and a rotor carrying the first armature. Typically, the main generator has a rotor carrying the second field winding, and a stator carrying the second armature. Typically, the main exciter and main generator are powered by the same rotational action as the alternator. Conveniently, the rotors of the alternator, main exciter and main generator may be coaxially mounted in the variable speed generator, and, in use, rotate at the same speed. For example, they may be mounted on the same rotatable shaft.

Preferably, the second rectifier is a diode rectifier. Such rectifiers are passive and generally reliable, particularly at the high rotational speeds which the rectifier may experience.

Preferably, the first rectifier is a voltage regulator circuit.

The second field winding may include a plurality of pole windings, the selectively activatable pole configurations being produced by switching on or off and/or reversing the polarities of selected of the pole windings. For example, the control arrangement can include:

a control switch for changing the frequency of the distribution current, a secondary exciter having a third field winding which on operation of the control switch receives the rectified first AC current, and a third armature which produces in response a third AC current, a third rectifier which rectifies the third AC current from the third armature, and a switching circuit which is activated by the rectified third AC current to switch on or off and/or reverse the polarities of selected of the pole windings of the second field winding and thereby activates a different pole configuration. The switching circuit can then include a plurality of field effect transistors (e.g. MOSFETS), the rectified third AC current providing gate currents for the transistors, and the conducting channels between the sources and drains of the transistors transmitting the rectified second AC current from the second rectifier to the second field winding. For example, the polarity of each selected pole winding may be changed by an arrangement of depletion mode and enhancement mode field effect transistors in the switching circuit. In this way, a reliable means of switching on or off and/or reversing the polarities of selected of the pole windings can be achieved which can operate at high rotational speeds and does not require the use of brushes and slip rings. Typically, the secondary exciter is powered by the same rotational action as the alternator, main exciter and main generator. Typically, the secondary exciter has a stator carrying the third field winding, and a rotor carrying the third armature. Conveniently, the rotor of the secondary exciter may be coaxially mounted (e.g. on the same shaft) with the rotors of the alternator, main exciter and main generator.

Alternatively, the second field winding may include first and second independently activatable winding formations, the first winding formation providing a pole configuration having a first number of poles, and the second winding formation providing a pole configuration having a different second number of poles, such that the frequency of the output AC current can be varied by switching between the first and second winding formations. For example, the variable speed generator can further include:

a second main exciter having a third field winding which receives the rectified first AC current, and having a third armature which produces in response a third AC current, and a third rectifier which rectifies the third AC current from the third armature;

wherein:

the first winding formation receives the rectified second AC current, the second winding formation receives the rectified third AC current, and the control arrangement can include a control switch which directs the rectified first AC current to either the first field winding or the third field winding to change the frequency of the distribution current. Typically, the second main exciter is powered by the same rotational action as the alternator, main exciter and main generator. Typically, the second main exciter has a stator carrying the third field winding, and a rotor carrying the third armature. Conveniently, the rotor of the second main exciter may be coaxially mounted (e.g. on the same shaft) with the rotors of the alternator, main exciter and main generator.

The variable speed generator can be a variable frequency starter generator. More particularly, the variable speed generator can be an aircraft engine variable frequency starter generator, the alternator being powerable by rotational action extracted from the aircraft engine, and the output current being for use within the aircraft.

BRIEF DESCRIPTION OF THE DRAWINGS

Embodiments of the invention will now be described by way of example with reference to the accompanying drawings in which.

DETAILED DESCRIPTION

Figure 3:
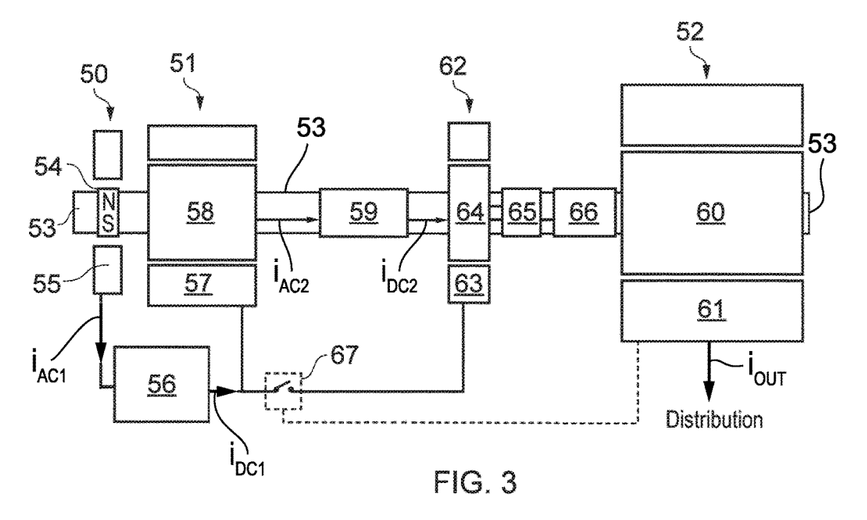
FIG. 3 shows a schematic diagram of a variable frequency starter generator according to a first embodiment of the present invention.

FIG. 3 shows a schematic diagram of a VFSG according to a first embodiment of the present invention. Like the VFSG of FIG. 2, the VFSG of the first embodiment includes a PMA 50, a main exciter 51 and a main generator 52. The rotating parts of the PMA, main exciter and main generator are all mounted on the same shaft 53 and rotate at the same speed. The PMA has permanent magnets mounted on its rotor 54. As the rotor spins, an AC main exciter voltage is induced across the stationary armature winding 55 of the PMA. This winding is connected to a voltage regulator circuit 56 which rectifies a controlled amount of AC current ($i_{AC1}$) from the PMA stator winding and injects DC current ($i_{DC1}$) into the stationary field winding 57 of the main exciter. This in turn induces e.g. a 3 phase AC voltage across the rotating armature winding 58 of the main exciter. A rotating diode rectifier circuit 59, which rectifies a controlled amount of AC current ($i_{AC2}$) from the rotating armature winding 58 and produces a DC current ($i_{DC2}$), is connected to the armature winding of the exciter. The output of this rotating rectifier 59 is then connected via a control arrangement (discussed below) to the rotating field winding 60 of the main generator 52, inducing an output AC voltage across the generator's stationary armature winding 61. The field winding 60 is configured to provide a plurality of selectively activatable pole configurations which differ in the number of their poles, such that the frequency of the output AC current ($i_{OUT}$) can be varied by switching between the pole configurations.

Unlike an induction machine, where the rotor poles are induced by the stator field, the rotating field windings 60 are directly supplied by the DC current from the rectifier circuit 59. However, the number of poles on the rotating field winding 60 can be varied without the use of brushes and slip rings, which would be undesirable due to the speed of rotation of the shaft 53. More particularly, the field winding 60 has individual pole windings, and the number of poles on the field winding can be varied by switching on or off selected of the pole windings, or reversing their polarities.

Figure 4A:
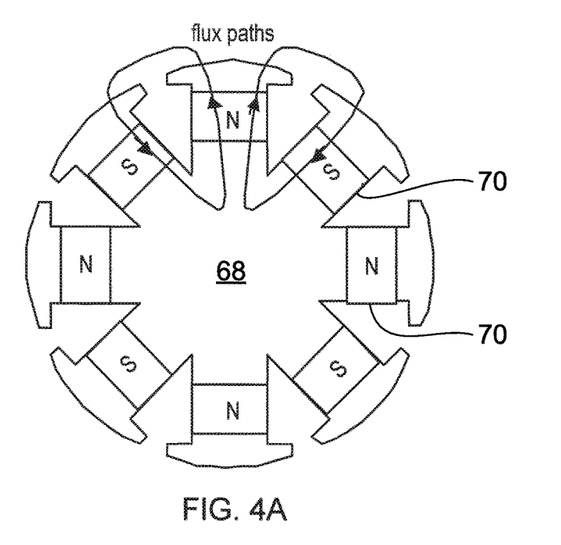
FIGS. 4(a) to (c) show respectively 8-pole, 4-pole and 4-pole salient pole configurations for the rotating field winding of the main generator of the variable frequency starter generator of FIG. 3.

The rotating field winding 60 can be of round rotor design or salient pole design. FIG. 4(a) shows, for example, a salient 8-pole rotor configuration for the winding. Each saliency comprises an iron core 68 and a pole winding 70, which produces a magnetic field when direct current is injected into the pole winding 70. Depending on the polarity of the injected current, the poles 72 will be either North (N) or South (S) polarity. Typically, the poles will be arranged in alternating polarities to give an even distribution of flux.

Figure 4B:
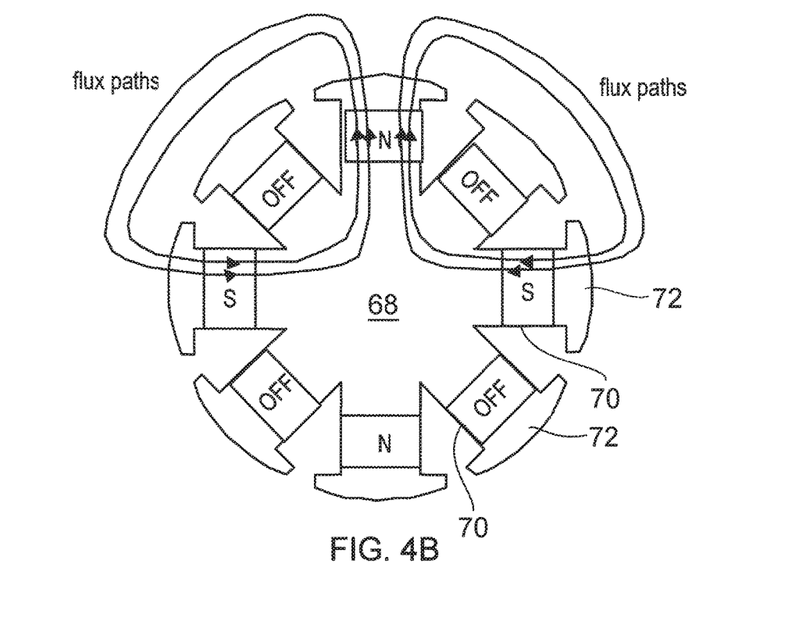

Switching to a 4-pole configuration can be achieved by switching off half the pole windings 70 and reversing the polarity on 2 of the remaining poles, as shown in FIG. 4(b). To provide the same voltage on the terminals of the main generator 52, the amount of field current in the rotating field winding 60 can be increased, increasing the flux density in the iron cores 68 of the active poles. The size of the poles 72 is determined by the configuration with the lowest number of poles as the maximum allowable flux density is limited by the iron core material.

Figure 4C:
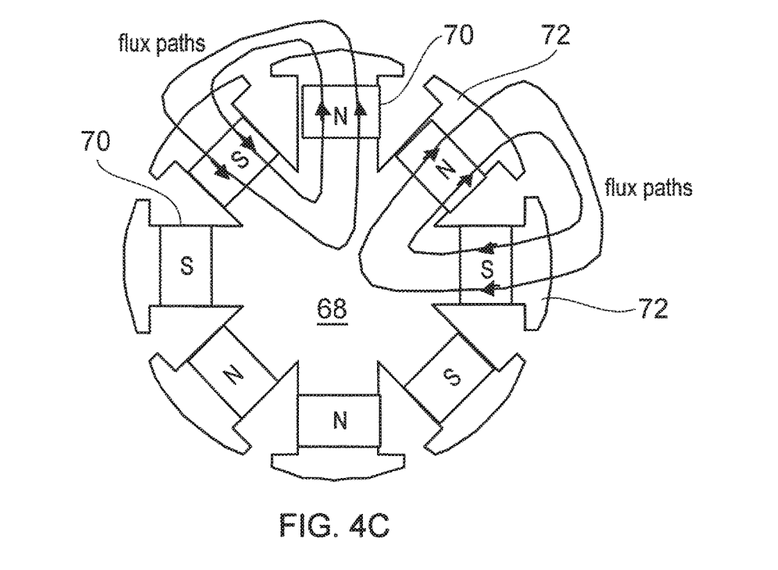

An alternative approach is to have all the poles active and to change the polarity such that each magnetic pole is shared between 2 adjacent saliencies, as shown in the configuration of FIG. 4(c). This allows the flux density to remain the same as the 8-pole configuration of FIG. 4(a), but may incur higher harmonic content than the configuration shown in FIG. 4(b).

Figure 5A:
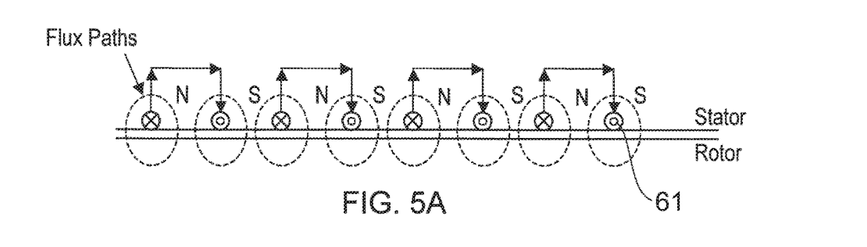
FIGS. 5(a) and (b) show respectively 8-pole and 4-pole configurations for the stationary armature winding of the main generator for use with the pole configurations of FIG. 4.
Figure 5B:
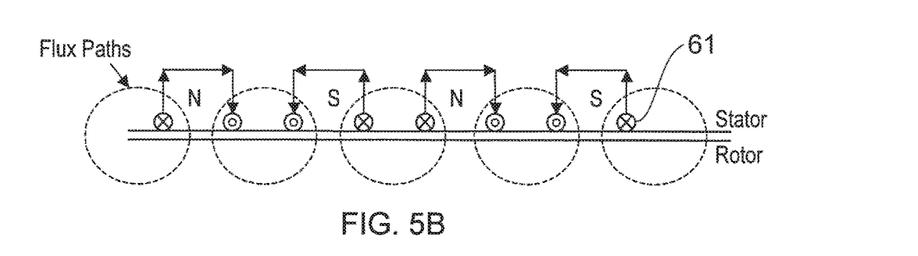

The poles on the stationary armature winding 61 can be reconfigured by switching armature winding connectors to match the number of poles on the field winding 60. For example, FIGS. 5(a) and (b) show respectively 8-pole and 4-pole configurations of the armature winding 61 achieved by switching the polarity of every second pole winding 70. In FIGS. 5(a) and (b), for convenience the armature is represented as a linear armature and the pole windings 70 are represented by single coils. The North (N) and South (S) poles are shown between the flux paths.

Figure 6A:
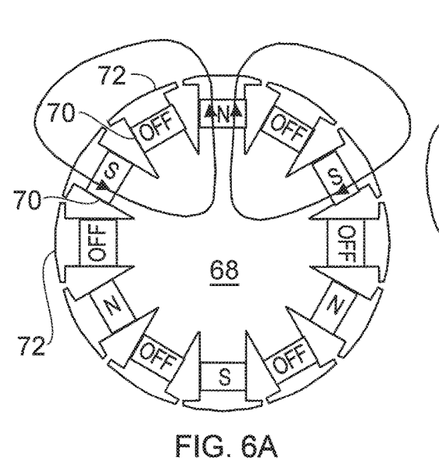
FIGS. 6(a) and (b) show respectively 6-pole and 4-pole salient pole configurations for the rotating field winding of the main generator of the variable frequency starter generator of FIG. 3.
Figure 6B:
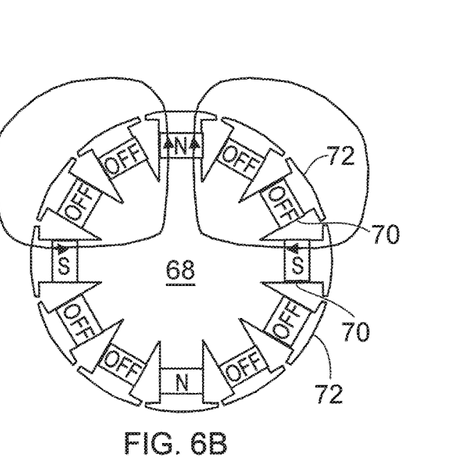
Figure 7A:
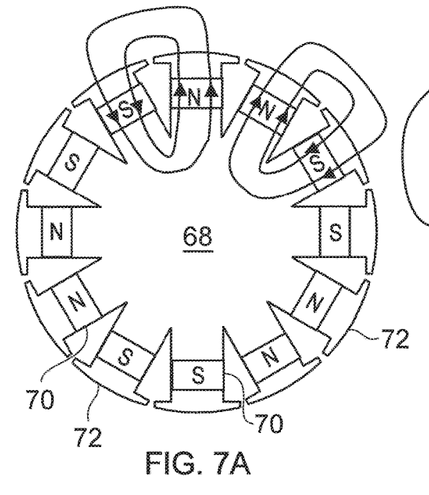
FIGS. 7(a) and (b) show alternative 6-pole and 4-pole salient pole configurations, respectively, for the rotating field winding of the main generator of the variable frequency starter generator of FIG. 3.
Figure 7B:
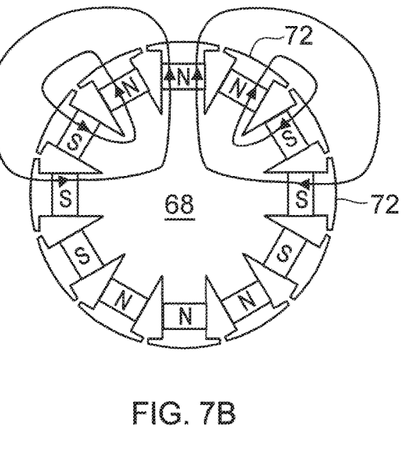
Figure 8A:
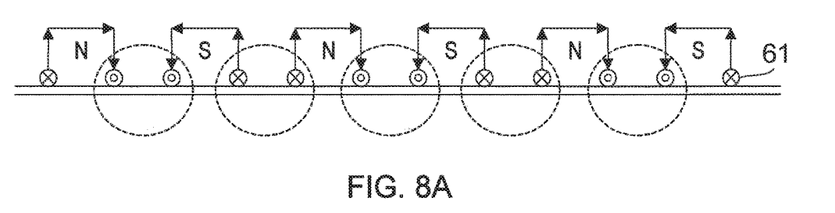
FIGS. 8(a) and (b) show respectively 6-pole and 4-pole configurations for the stationary armature winding of the main generator for use with the pole configurations of FIGS. 6(a) and (b) or FIGS. 7(a) and (b)
Figure 8B:
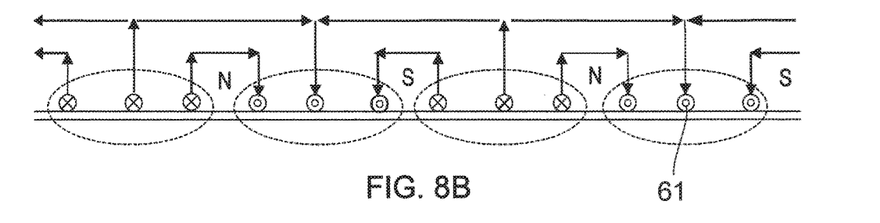

Depending on the specific application, it may be desirable to switch to a different ratio of poles, rather than the 2:1 ratio of FIGS. 4(a) to (c). For example, if switching from a 6-pole configuration to a 4-pole configuration, the rotating field winding 60 must contain the least common multiple of saliencies i.e. 12. FIG. 6(a) shows a 6-pole configuration on such a 12 saliency pole rotor. To switch to a 4-pole configuration, four pole windings 70 can be switched off, two pole windings 70 can be switched on, and the polarity of one pole winding 70 can be reversed, as shown in FIG. 6(b). FIG. 7(a) shows an alternative 6-pole configuration on a 12 saliency pole rotor. To switch to a 4-pole configuration, the polarities of six pole winding 70 can be reversed, as shown in FIG. 7(b). Advantageously, this configuration uses all the available saliencies to form the poles. FIGS. 8(a) and (b) show respectively the corresponding 6-pole and 4-pole configurations of the stationary armature winding 61 achieved by placing, at the ends of the windings, switches or contactors that connect different wires within the armature together, to give the desired pole configuration.

Returning to FIG. 3, as mentioned above, the rotating diode rectifier circuit 59, which produces a DC current, is connected via a control arrangement to the rotating field winding 60 of the main generator 52. The control arrangement includes a secondary exciter 62, a passive (e.g. diode-based) rectifier circuit 65, and a rotating switching circuit 66, which are all located on the shaft 53 between the main exciter 51 and the main generator 52. The secondary exciter 62 is an inside-out machine, similar to the main exciter 51, in which the field winding 63 is located on the stator and the armature winding 64 on the rotor. The secondary exciter typically provides either single phase or 3-phase AC current on the rotor, which is rectified to DC by the rectifier circuit 65. The DC current is then fed to the switching circuit, which switches on or off and/or reverses the polarities of selected of the pole windings of the rotating field winding 60 to activate a different pole configuration in the main generator 52.

The switching circuit 66 contains an arrangement of semiconductor-based switches. The conducting channels of the switches receive the output of the rotating rectifier 59. The secondary exciter 62 provides a gate current to the switches. Each switch either switches on or off individual pole windings of the field winding 60 or reverses the polarity of the pole windings, to give a desired new pole configuration on the rotor of the main generator 52.

Figure 9:
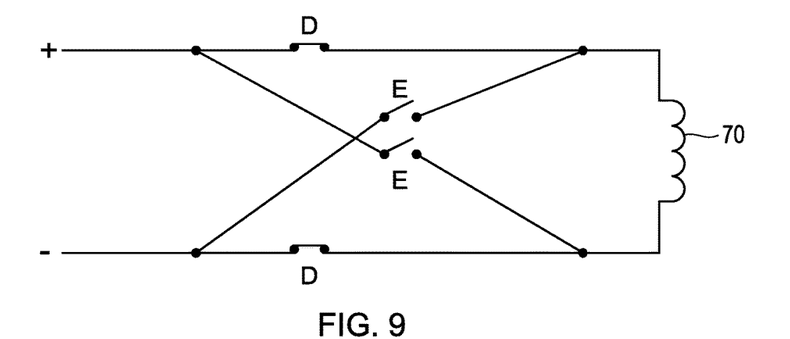
FIG. 9 shows an arrangement of depletion mode (D) and enhancement (E) mode switches to switch the polarity of a pole winding.

As the switches are typically required to carry approximately 10-100 A, they are generally high-powered devices such as power MOSFETs (metal-oxide-semiconductor field-effect transistors). Both depletion mode and enhancement mode MOSFETs can be used to switch from one pole configuration to another. The depletion mode MOSFETs conduct when there is no gate current and open when gate current is applied, while the enhancement mode MOSFETs open when there is no gate current and conduct when gate current is applied. For example, to switch the polarity of a pole winding 70, an arrangement of depletion mode (D) and enhancement (E) mode switches can be used as shown in FIG. 9. In this arrangement the depletion mode switches will conduct and the enhancement switches will open when no gate current is applied, i.e. the secondary exciter 62 is not providing power. When the secondary exciter is switched on it provides gate current, opening the depletion mode switches and closing the enhancement mode switches and thus reversing the polarity of the winding.

This secondary exciter 62 generally has a lower rating than the main exciter 51, as it only needs to provide gate current to the switches.

The control arrangement also includes a switch 67 which determines whether or not the field current provided by the voltage regulator circuit 56 is sent to the secondary exciter 62. When the switch 67 is closed, the secondary exciter 62 is activated and gate current flows to the switches of the switching circuit 66. When the switch 67 is open, the secondary exciter 62 is disabled and no gate current flows. The switch 67 can also be operatively connected (dashed line) to the stationary armature winding 61 so that its poles are reconfigured to match the number of poles on the field winding 60 when the switch 67 is operated.

The VFSG can switch poles on the main generator 52 during operation thus providing a wider rotational speed range for the shaft 53 while remaining within a predetermined electrical frequency range of the output AC current. The VFSG can provide and control its own reactive power and terminal voltage. As it does not require brushes and slip rings, it is suitable for high-speed applications and should not require high levels of maintenance.

Figure 10:
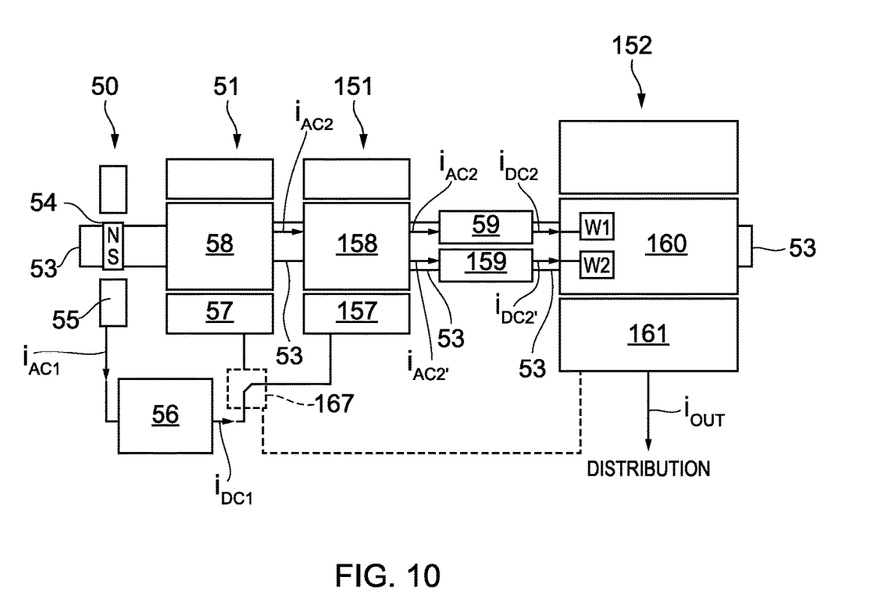
FIG. 10 shows a schematic diagram of a variable frequency starter generator according to a second embodiment of the present invention.

FIG. 10 shows a schematic diagram of a VFSG according to a second embodiment of the present invention. Corresponding features have the same reference numbers in FIGS. 3 and 10. Like the VFSG of the first embodiment, the VFSG of the second embodiment includes a PMA 50, a main exciter 51 and a main generator 152. The rotating parts of the PMA, main exciter and main generator are all mounted on the same shaft 53 and rotate at the same speed. The PMA has permanent magnets mounted on its rotor 54. As the rotor spins, an AC main exciter voltage is induced across the stationary armature winding 55 of the PMA. This winding is connected to a voltage regulator circuit 56 which rectifies a controlled amount of AC current ($i_{AC1}$) from the PMA stator winding and injects DC current ($i_{DC1}$) into the stationary field winding 57 of the main exciter. This in turn induces e.g. a 3 phase AC voltage across the rotating armature winding 58 of the main exciter 51.

The alternative arrangement used by the second embodiment for changing the poles on the rotor of the main generator 152 without the use of brushes and slip rings includes the (first) main exciter 51 and a second main exciter 151 operating at the same power level as the first main exciter 51, along with a second rotating diode rectifier 159 for the second main exciter 151. Similar to the first main exciter 51, the second main exciter 151 includes a second stationary field winding 157 and a second rotating armature winding 158. The first and second rotating diode rectifier circuits 59, 159, which respectively rectify a controlled amount of AC current ($i_{AC2}$, $i_{AC2'}$) from the first and second rotating armature windings 58, 158 and produce a DC current ($i_{DC2}$, $i_{DC2'}$), are connected to the armature winding 58, 158 of the respective main exciter 51, 151. The output of this first or the second rotating rectifier 59, 159 is then connected to the rotating field winding 160 of the main generator 152, inducing an output AC voltage across the generator's stationary armature winding 161.

As discussed above, the VFSG of the first embodiment includes a rotating field winding 60 having a single winding formation and a switching circuit 66 that switches on or off individual pole windings of the rotating field winding 60 or reverses the polarity of the pole windings to provide a plurality of selectively activatable pole configurations which differ in the number of their poles, such that the frequency of the output AC current ($i_{OUT}$) can be varied by switching between the pole configurations. In the VFSG of the second embodiment, the rotating field winding 160 of the main generator 152 has first and second independently activatable winding formations W1, W2, and each of the winding formations W1, W2 has a different number of poles. The outputs of the first and second rotating rectifiers 59, 159 are then connected to respectively the first and second winding formations W1, W2, inducing an output AC voltage across the main generator's stationary armature winding 161. For example, the first and second winding formations W1, W2 can be provided by respectively a first set of pole windings and a second set of pole windings on each saliency of the rotor of the main generator 152.

In the second embodiment, the control arrangement is simply a switch 167 that switches the output of the voltage regulator circuit 56 between the first main exciter 51 and the second main exciter 151. Again, the switch 167 can also be operatively connected to the stationary armature winding 161 so that its poles are reconfigured to match the number of poles on the field winding 160 when the switch 167 is operated.

However, a drawback of this the second embodiment is that it tends to increase the overall size of the VFSG. Additionally, as there are two separate winding formations W1, W2 on the rotating field winding 160, undesirable voltage may be induced in the inactive formation.

Although the VFSG of the first and second embodiments is intended for aircraft use, a variable speed generator according to the present invention may also find use in other applications, particularly where it is desired to extend the rotational speed range of the shaft and to avoid the use of brushes and slip rings.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A variable speed generator for producing alternating current (AC) electrical power, the variable speed generator including:
    an alternator (50) powerable by rotational action to generate a first AC,
    a first rectifier (56) which rectifies the first AC from the alternator to provide a rectified first AC,
    a first main exciter (51) having a first field winding (57) which selectively receives the rectified first AC, and having a first armature (58) which generates in response a second AC,
    a second rectifier (59) which rectifies the second AC from the first armature to provide a rectified second AC, and
    a second main exciter (151) having a third field winding (157) which selectively receives the rectified first AC, and having a third armature (158) which produces in response a third AC,
    a third rectifier (159) which rectifies the third AC from the third armature to provide a rectified third AC,
    a control arrangement including a control switch (167), the control arrangement for selecting the first main exciter or the second main exciter so that the selected main exciter receives the rectified first AC, and
    a main generator (152) having:
        a second armature (161) which generates an output AC; and,
        a second field winding (160) which includes first and second independently activatable winding formations, wherein
            the first winding formation is connected to the second rectifier so as to receive the rectified second AC when the first main exciter is selected by the control arrangement, the first winding formation having a pole configuration with a first number of poles, and
            the second winding formation is connected to the third rectifier so as to receive the rectified third AC when the second main exciter is selected by the control arrangement, the second winding formation having a pole configuration with a second number of poles which is different from the first number of poles,
        wherein a frequency of the output AC can be varied by switching between the first and second winding formations.

2. The variable speed generator according to claim 1, wherein the variable speed generator is an aircraft engine variable frequency starter generator, the alternator being powerable by rotational action extracted from an aircraft engine, and the output AC being for use within an aircraft.

* * * * *